United States Patent [19]

Hicks et al.

[11] 4,038,757
[45] Aug. 2, 1977

[54] EXTERNAL ADJUSTMENT KNOB FOR TELESCOPIC SIGHTS

[75] Inventors: Edward H. Hicks, Santa Barbara; Charlene Lenhart, Whittier, both of Calif.

[73] Assignee: Hicks Associates, Inc., El Toro, Calif.

[21] Appl. No.: 739,660

[22] Filed: Nov. 8, 1976

[51] Int. Cl.² .................. F41G 1/38; B25B 15/00; G02B 27/32; G02B 23/10
[52] U.S. Cl. ................... 33/247; 145/50 R; 350/10; 356/252
[58] Field of Search ............. 33/246, 247, 248; 350/10; 356/252; 145/50 R

[56] References Cited
U.S. PATENT DOCUMENTS

| 2,721,589 | 10/1955 | Hammer | 145/50 R |
| 3,826,012 | 7/1974 | Pachmayr | 33/254 |
| 3,990,155 | 11/1976 | Akin et al. | 33/246 |

Primary Examiner—Steven L. Stephan
Attorney, Agent, or Firm—Edgar W. Averill, Jr.

[57] ABSTRACT

An external adjustment knob for attachment to a telescopic sight with a cylindrical body which attaches to the telescopic sight. A knob is affixed to the cylindrical body and cooperates with the adjustment screw which forms a part of the sight.

10 Claims, 4 Drawing Figures

U.S. Patent  Aug. 2, 1977  4,038,757
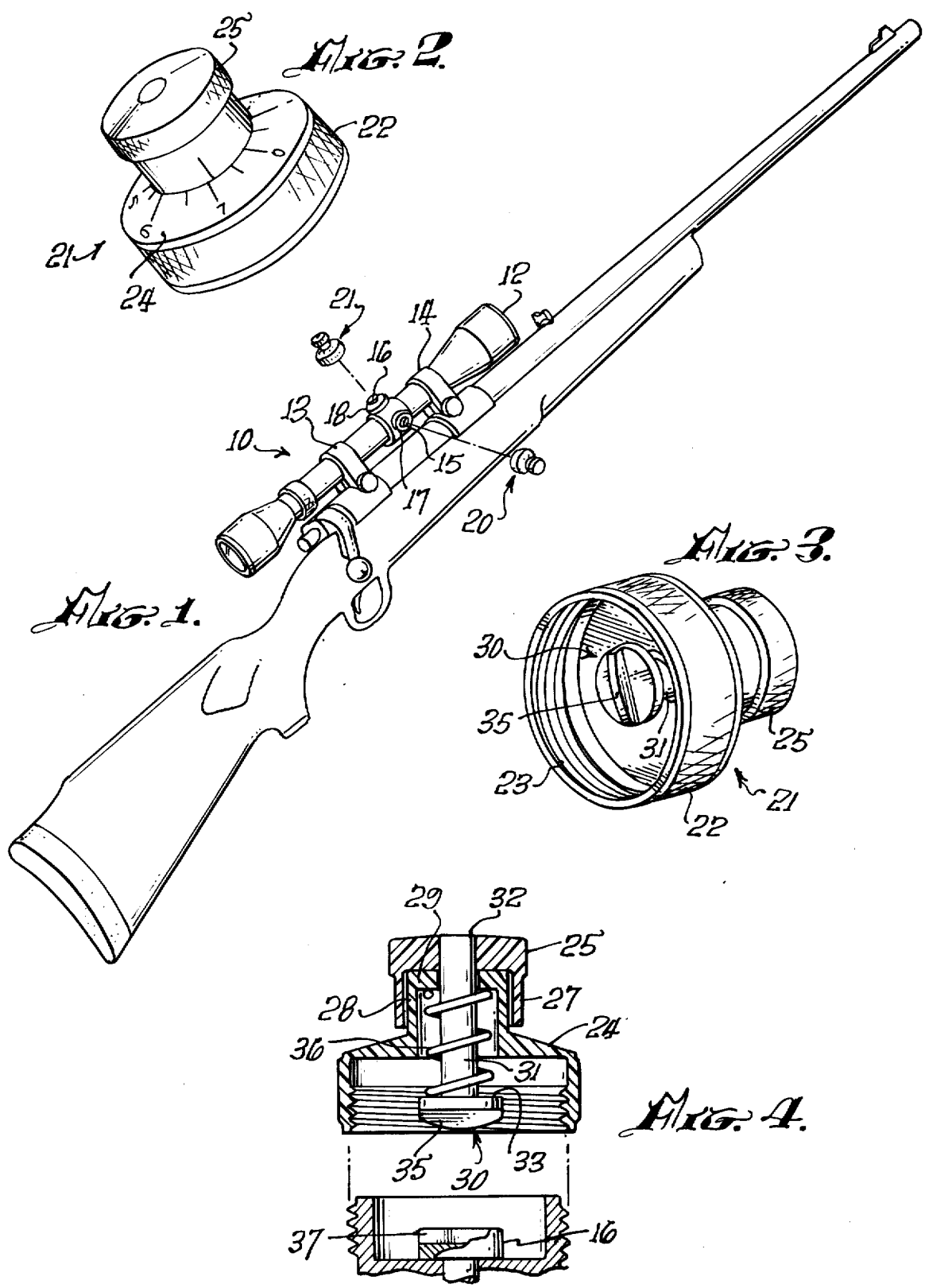

EXTERNAL ADJUSTMENT KNOB FOR TELESCOPIC SIGHTS

BACKGROUND OF THE INVENTION

The field of the invention is telescopic sights for firearms. Such sights magnify the target and make it possible to identify and aim accurately at small targets even at long ranges and under poor light conditions.

Telescopic sights are precisely adjustable for alignment and zeroing. While some telescopic sights are adjusted by adjustments made in the mount, the typical scope contains a pair of very precise adjustments which move the reticle cell of the sight by means of a finely threaded internal stem which protrudes outwardly from the scope. External adjustment knobs are provided on many scopes however, such knobs are often inconvenient and lead to maladjustment because they may be inadvertently moved by contact with other objects. Therefore, many telescopic sights are provided with turret caps which cover the adjustment means. Commonly, the adjustment means consists of a slotted screw head which protrudes outwardly from the body of the sight and may be moved by a coin, screwdriver or other object which fits into the slot. A threaded cap covers the scope adjustment coin slot in order to prevent its unintentional movement.

For many uses, however, the external adjustment knob is desirable and facilitates the zeroing in of the scope because of its ease of use and because it may be readily turned by the fingers. Many times the sight is used under conditions where the use of the standard turret cap cover is unnecessary while at other times, the same sight would be used under conditions when the cover would be highly beneficial. For instance, the turret caps would be useful while the firearm is being transported but would be an inconvenience once the firearm was being used in the field or on a firing range. It has heretofor been impossible to provide an adjustment screw which is both easily adjusted in use and secure against misalignment during transit.

SUMMARY OF THE INVENTION

It is thus an object of the present invention to provide a means for converting a telescopic sight having adjustment screws which are normally covered in turret cap covers to a telescopic sight of the type which permits adjustment by an external knob.

The present invention is for an improved telescopic sight of the type having windage and elevation adjustment screws which screws are protected by a turret cap cover held by a support ring positioned along the body of the sight. The improvement is a cylindrical member having a first open end and a second end, the open end of which has holding means of an appropriate size to match the holding means used to hold the turret cap cover over the adjustment screw. A knob is affixed to the second end of the cylindrical member in a freely rotatable and co-axial position with respect to the cylindrical member. Screwdriving means are affixed to the knob and positioned along the cylindrical axis of the knob. Biasing means are positioned between the screwdriving means and the cylindrical member so that the screwdriving means are urged toward the open end of the cylindrical member.

BRIEF DESCRIPTION OF THE DRAWINGS

FIG. 1 is a perspective view of a telescopic sight having the external adjustment knobs of the present invention shown positioned away from the telescopic sight.

FIG. 2 is an enlarged perspective view of the upper surface of the external adjustment knob of FIG. 1.

FIG. 3 is an enlarged perspective view of the lower side of the external adjustment knob of FIG. 1.

FIG. 4 is an enlarged cross sectional view of the external adjustment knob of FIG. 1.

DESCRIPTION OF THE PREFERRED EMBODIMENTS

A telescopic sight 10 is shown in perspective view in FIG. 1. The ocular lens 11 is shown at the left side of FIG. 1 and the objective lens 12 is shown on the right side. Sight 10 is mounted on the firearm by means of a rear mount 13 and a forward mount 14 which together with the other portions of the sight described above are conventional.

A windage adjustment screw 15 permits the precise movement of the vertical crosshair from left to right or right to left to correct for wind or misalignment of the scope. Screw 15 positions the vertical crosshair in the reticle cell within the body of the scope. Elevation adjustment screw 16 moves the horizontal crosshair in the reticle cell to correct for height or distance. The adjustment of screws 15 and 16 are commonly preformed to zero in on a target once the distance and external conditions are known.

Adjustment screws 15 and 16 are commonly coin slots and may be turned for inserting a coin or screwdriver in the slot. Each screw is protected by a turret cap, not shown, which is threaded onto collars 17 and 18 in order to prevent the inadvertant movement of screws 15 and 16. Many telescopic sights are provided with permanent adjustment knobs for windage and elevation but such adjustment knobs are readily moved unintentionally and the zeroing in process must be preformed again. It is for this reason that turret caps are widely used to prevent unintentional misadjustment.

Unintentional misadjustment is not likely when the user is in position for shooting. At such times, it would be preferable to have externally adjustable knobs to eliminate the necessity and inherent inconvenience of inserting a coin in the slot to turn the fine adjustment screws. Furthermore, in many instances it is useful to have external markings to indicate the proper location of one or both of the knobs. For instance, if the distance to the target is not known, it is useful to zero in at several different distances making note of the positioning of the knob at several shooting distances. In this way, when the target distance is known, the proper adjustment can be quickly and accurately made.

The external adjustment knobs of the present invention are shown in FIG. 1 and indicated by reference characters 20 and 21. Knob 20 permits external adjustment of the windage adjustment screw 15 and threads onto collar 17. Similarly, external adjustment knob 21 permits the external turning of screw 16 and threads onto collar 18. Knobs 20 and 21 are identical although they may be made with different colors or different markings if desired. For purposes of the present descriptions however, the knobs may be considered as identical. Knob 21 is shown in enlarged perspective view in FIG. 2. A cylindrical skirt 22 is knurled on the outer surface to facilitate threading onto collar 18. The interior of skirt 22 is shown in FIG. 3 and threads 23 are adapted to mate with collar 17. Skirt 22 terminates in a cover 24 which has numerical indicia marking which cooperates more with an indicator mark on knob 25. The outer surface of knob 25 is also knurled for ease of adjustment. Alternatively, the indicia could be located on knob 25 and the indicator mark on cover 24.

Knob 25 is shown in cross sectional view in FIG. 4. As can be seen in FIG. 4, cover 24 has a cylindrical wall 28 which fits within skirt 27 to help prevent dirt or water from entering the interior of the knob. Wall 28 terminates in an upper ring 29 which cooperates with spring 36 in a manner described more fully below. A screwdriving arm indicated generally by reference character 30, has a shaft 31 which is permanently fixed to knob 25 at its upper end 32. Arm 31 has a lower shoulder 33 which forms a cylinder 34 which terminates in a blade 35. Lower shoulder 33, together with ring 29, form the two surfaces against which spring 36 is biased. Blade 35 is adapted to fit in slot 37 of elevation adjustment screw 16.

In use, the standard turret cap cover is unscrewed from collar 18 and knurled skirt 22 is threaded on the same collar 18 which formerly held the turret cap cover. Once fully screwed onto the collar, knob 25 is turned until blade 35 enters slot 37 of screw 16. At this point, further turning of knob 25, of course, turns screw 16. Indicator mark 26 cooperates with indicia on cover 24 to indicate the rotational position of screw 16.

While the combination of cylindrical wall 28 and skirt 27 is particularly effective in preventing dirt and moisture from entering the area surrounded by collar 18, other means of bringing about this result may also be used. For instance, an O ring and/or other sealing member could be positioned between knob 25 and cover 24 to provide a weather-proof seal.

Because of weight and appearance, black, anodized aluminum is the material of preference for construction of the external adjustment knobs of the present invention. A pair of knobs made from this material weigh approximately five ounces which is only slightly more heavy than the turret cap covers normally supplied with such scopes.

Whereas spring 36 is shown as a coiled spring other biasing means may also be used such as an elastomeric cylinder. The spring, rather than being biased on ring 29, could instead be biased on cover 24 and perform the same function. While knurled skirt 22 is shown as having a threaded interior, other means for attachment are also contemplated. The adjustment means should cooperate with the turret cap cover holding means so that the dual advantages of the present invention may be realized. That is, a single scope may be provided with a secure covered adjustment screw while at the same time be readily and inexpensively modified to prevent more easy external adjustment by the simple attachment of the adjustment knob of the present invention.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

What is claimed is:

1. In a telescopic sight of the type having windage and elevation adjustment screws, which screws are surrounded by a support ring with holding means to permit the attachment of turret caps thereon, wherein the approvement comprises:

a cylindrical member having a first open end and a second end, said cylindrical member having holding means of an appropriate size to match the holding means on the support ring of the telescopic sight;

a knob affixed to the second end of said cylindrical member in a freely rotatable and co-axial position with respect thereto;

screwdriving means affixed to said knob and positioned along the central axis of said knob; and biasing means between said screwdriving means and said cylindrical member, said biasing means urging said screwdriving means inwardly toward the open end of said cylindrical member.

2. The knob of claim 1 wherein said cylindrical member and knob are provided with indicia for indicating rotational position.

3. The knob of claim 1 wherein said knob is fabricated from anodized aluminum.

4. The knob of claim 1 wherein said biasing means rests on a shoulder located in the second end of said cylindrical member and also resting on the upper surface of said screwdriving means.

5. The knob of claim 1 wherein said ring and cap are threaded.

6. The knob of claim 1 wherein the second end of said cylindrical member has a cover portion with a central opening having a raised wall surrounding the central opening and wherein said knob is a cylindrical member having an open end having an inside diameter sufficient to permit said knob to fit over said raised wall and said knob having a closed end to which said screwdriving means are affixed.

7. The knob of claim 6 wherein indicia are positioned on said cover portion and an indicator mark is positioned on the outer side wall of said knob.

8. The knob of claim 6 further including a second cover portion located at the upper extremity of said raised wall, said second cover portion having an axially positioned opening, so that said second cover portion forms a base for said biasing means.

9. The device of claim 8 wherein said biasing means is a coiled spring.

10. The device of claim 9 wherein said cap, knob and screwdriving means are fabricated from aluminum.

* * * * *